(12) United States Patent
Pouchkarev

(10) Patent No.: US 6,869,047 B2
(45) Date of Patent: Mar. 22, 2005

(54) KITE SAFETY DEVICE

(76) Inventor: Alexander S. Pouchkarev, 150 W. Oak Knoll Dr., San Anselmo, CA (US) 94960

( * ) Notice: Subject to any disclaimer, the term of this patent is extended or adjusted under 35 U.S.C. 154(b) by 188 days.

(21) Appl. No.: 10/613,133

(22) Filed: Jul. 3, 2003

(65) Prior Publication Data

US 2004/0004160 A1 Jan. 8, 2004

Related U.S. Application Data

(63) Continuation of application No. 10/360,791, filed on Jul. 3, 2002.

(51) Int. Cl.[7] ............................................... B64C 31/06
(52) U.S. Cl. ..................... 244/155 A; 244/152; 244/902
(58) Field of Search .......................... 244/153 R, 155 A, 244/900, 902, 152, 142

(56) References Cited

U.S. PATENT DOCUMENTS 5,366,182 A * 11/1994 Roeseler et al. ........ 244/155 R
6,513,759 B2 * 2/2003 Starbuck ................. 244/155 A
6,514,115 B2 * 2/2003 Harich ........................ 446/34
6,581,879 B2 * 6/2003 Bellacera ................ 244/155 A
2002/0185570 A1 * 12/2002 Winner .................... 244/155 A

* cited by examiner

*Primary Examiner*—J. Woodrow Eldred
(74) *Attorney, Agent, or Firm*—Craig M. Stainbrook; Larry D. Johnson; Johnson & Stainbrook, LLP

(57) ABSTRACT

A kite safety device for a kite having an airfoil with leading and trailing edges, at least two control lines attached to the airfoil and a control flying bar attached to at least two of the control lines. The device features a trim line having a hollow central passageway, sized and shaped to fit slidably through a central opening in the control flying bar. A safety flying line is attached at its first end to a first point adjacent a midpoint along a centerline extending from the leading edge to the trailing edge and attached through said passageway at its second end to a fixture providing a point for attachment of the flying line to a harness. When the control flying bar is released a user may rotate beneath the kite and when the safety flying line is tensioned, the kite will begin to stall and the kite will descend.

19 Claims, 16 Drawing Sheets

KITE SAFETY DEVICE

RELATED APPLICATION

The instant application is a Non-provisional Utility Application which is a continuation of application Ser. No. 10/360,791 filed Jul. 3, 2002, which was converted from U.S. Provisional Application Ser. No. 60/394,364 filed Jul. 3, 2002 and currently pending.

FIELD OF INVENTION

The invention pertains to equipment used in the sport of kite surfing and related activities involving kites having controllable airfoils. More particularly, the invention relates to a device for managing the control lines associated with such a kite.

BACKGROUND OF THE INVENTION

The present invention relates to multiple line kites. Although the concept of kites has been around for centuries, kiting with multi-meter area kites, capable of lifting the user high into the air and attaining high speed, has become a popular sport in recent years. The most common design for this activity is with the use of a four line traction kite. Typically, the kite has a foil, stabilizing struts, a rigid leading edge, two front lines attached to the front end corners of the kite and two back lines attached to the back end corners of the kite. The other ends of the lines attach to a control bar, held by the user for controlling and manipulating the kite's speed and direction. The back lines attach to the ends of the control flying bar, the front lines attach to a center line that may be attached directly to the control flying bar or to the user via a trip loop and a harness.

Several problems arose during the early use of such kites. One such problem is the need to quickly de-power the kite while still retaining control over it. One solution typically employed to accomplish this is a wrist safety leash, attached to the user's wrist or ankle on one end and at a point on one of the back lines on the other end. If users find themselves in an emergency situation, they can completely release the control bar, whereby the kite will de-power. The problem with the wrist safety leash is that it will cause the kite spin out of control and crash to the ground or water; the user will have no opportunity to regain control of the kite. Furthermore, once the kite is down, the lines of the kite are tangled up with the safety leash causing potentially several hours worth work untangling the lines.

Another set of solutions to the need for the need to quickly de-power the kite that are in practice is to allow the user to vary the lengths of the front and back lines while flying the kite. This is accomplished either through use of an adjustable center line strap connected to the front lines, or by allowing the control bar to slide freely over the center line, thereby increasing the effective length of the back lines. While these enabled the user to decrease the power of the kite and still maintain control, the user is limited by the range of motion of the control bar and the limited adjustability of the adjustable center line strap. Often users may find themselves in situations where the limited amount of de-powering provided by the above devices is insufficient and will have to release the control bar and rely on the safety leash.

Another problem is the tendency of the kite to rotate relative to the control bar during times when the kite is on the ground or water or if the user rotates the bar while performing stunts. One solution to this was the idea of having the front lines connect to a center line which passes through a hollow tube in the control bar and attaches directly to the user thereby allowing the back lines to be rotatably independent from the front lines. The problem with this approach is that although it is possible to untwist the back lines, the front lines still remain twisted.

Finally, when users need to land the kite, especially in moderate to strong wind conditions, it generally requires the assistance of a second person to catch the kite to keep the kite from becoming tangled and twisted. Without assistance, users would normally have to release the control bar and pull the kite in by the safety leash attached to one of the lines. As previously stated, this can cause the kite to lose control and its lines become tangled.

It is an objective of the present invention to provide a device for safely and quickly de-powering a kite while continuing to maintain control. It is a still further objective of the invention to provide a way for a single user to land a kite unassisted and in a controlled manner so as to prevent the kite from crashing and keeping the lines untangled. It is yet a further objective to provide a device that will prevent the lines from becoming tangled while the kite is use. It is yet another objective to provide a means for increased control of the kite while it is being flown by the safety flying line. Finally, it is an objective of the invention to provide a way to quickly disconnect all loops from the user.

While some of the objectives of the present invention are disclosed in the prior art, none of the inventions found include all of the requirements identified.

SUMMARY OF THE INVENTION (1) A kite safety device for a kite is according to the present invention may be fabricated for a kite having an airfoil with leading and trailing edges, at least two control lines attached to distal ends of the airfoil and a control flying bar attached to at least two of the control lines using the following components. A trim line is provided. The trim line has an upper end and a lower end and central passageway extending from the upper end to the lower end and is sized and shaped to fit slidably through a central opening in the control flying bar of a kite.

The trim line has a first stopper adjacent the upper end and a second stopper adjacent the lower end. The stoppers are sized and shaped to prevent the upper and lower ends of the trim line from passing through the central opening.

An upper swivel is provided. The upper swivel has a top portion and a bottom portion. Each of the top and bottom portions have a hollow central core, a first end and a second end. The top portion is attached at its first end to the lower end of the trim line. The bottom portion is rotatably attached at its first end to the second end of the top portion and attached at its second end to a trim loop of the kite.

A safety flying line is provided. The flying line has first, second and third segments. The first segment has a first end and a second end and is attached at its first end to a first point adjacent a midpoint along a centerline extending from the leading edge to the trailing edge. The second segment has a first end and a second end. The second segment is attached at its first end to the second end of the first segment and has a third stopper attached adjacent its second end. The third stopper is sized and shaped to prevent the second end of the second segment from passing through a ring passage attached to an adjustable strap connected to the upper end of the trim line. The third segment has a first end and a second end and is attached at its first end to the second end of the second segment and attached at its second end to a first end of an upper portion of a lower swivel.

The upper portion of the lower swivel is rotatably mounted at a second end to a first end of a lower portion of the lower swivel. A second end of the lower portion of the lower swivel is attached to a fixture. The fixture provides a point for attachment of the flying line to a harness. When said control flying bar is released a user will be free to rotate beneath the kite and when tension is applied to the safety flying line, the kite will begin to stall and the kite will descend.

(2) In a variant of the invention, the second segment of the safety flying line is formed of resilient material.

(3) In a further variant, the second segment of the safety flying line is capable of elongating to include its original length plus a distance between the third stopper and the ring passage, thereby maintaining tension in said safety flying line.

(4) In still a further variant, the third segment of the safety flying is formed of wear resistant material, thereby preventing breakage of said third segment due to friction with the central passageway.

(5) In another variant of the invention, the first point is adjustably mounted along the center line, thereby altering performance of said kite when said safety flying line is employed.

(6) In still another variant, the first end of the first segment of the safety flying line is divided into a front portion and a rear portion. The front portion attaches adjacent to the first point and the rear portion attaches at a second point on the center line behind the front portion.

(7) In yet another variant, the length either of the front portion or the rear portion of the safety flying line is adjustable, thereby permitting stall characteristics of the kite as controlled by the safety flying line to be customized.

(8) In still a further variant, the first end of the first segment of the safety flying line is divided into a first side portion and a second side portion. The first and second side portions attach adjacent to the second and third points spaced equidistantly from the centerline of the kite.

(9) In another variant of the invention, the positions of the second and third points are adjustable along lines parallel to the centerline.

(10) In still another variant, the positions of the second and third points are adjustable toward and away from the centerline.

(11) In still a further variant, the first end of the first segment of the safety flying line is divided into a first side portion, a second side portion and a rear portion. The first and second side portions attach adjacent to the second and third points and are spaced equidistantly from the centerline of the kite. The rear portion attaches adjacent to the first point.

(12) In yet a further variant of the invention, the positions of the first, second and third points are adjustable along lines parallel to the centerline.

(13) In still a further variant, the positions of the second and third points are adjustable toward and away from said centerline.

(14) In yet another variant, the upper swivel has a top portion fitted within and secured to the lower end of the trim line. The top portion includes a protruding first bearing surface. A bottom portion is provided that is formed as a cylinder and has a semi-enclosed upper end. The upper end has a central opening through it and a second mating bearing surface disposed around the central opening. The second mating bearing surface is sized and shaped to fit slidably upon the first bearing surface.

A bottom portion is provided that has a chamfered side opening and a central projecting member. A containing cover is provided. The cover has a semi-enclosed upper end. The upper end has a central opening through it. The central opening is sized and shaped to fit slidably over the trim line. The cover is sized and shaped to fit slidably over the upper swivel.

(15) In yet a further variant, the first bearing surface and second mating bearing surface are shaped to accommodate either of ball and roller bearings and the upper swivel is a plurality of either of ball and roller bearings.

(16) In another variant of the invention, the trim loop is formed of resilient material and has a first end and a second end. The first end is attached to the bottom portion of the upper swivel. The second end has a loop fitting. The loop fitting is sized and shaped to fit over the projecting member and within the chamfered opening. When the loop fitting is placed within the chamfered opening over the projecting member and the containing cover is lowered over the upper swivel, the second end of the trim loop will be secured to the bottom portion of the upper swivel.

(17) In still another variant, the fixture providing a point for attachment of the flying line to a harness has a coupling cord. The cord has a first end and a second end and is attached at its first end to the lower portion of the second swivel. An L-shaped hook is provided. The hook has an orifice at a first end and an upward facing point at a second end and is attached to the second end of the coupling cord at the orifice.

A retaining lanyard is provided. The lanyard has a first end and a second end and is attached at the first end to either of the orifice and the coupling cord. The lanyard has a loop at the second end and is sized and shaped to fit slidably over the upward facing point of the L-shaped hook. A retaining cap is provided. The cap is sized and shaped to fit slidably over the L-shaped hook and has a semi-enclosed upper end. The upper end has a central opening through it and the opening is sized and shaped to fit slidably over the coupling cord. The cap is disposed upon the coupling cord above the L-shaped hook. When the lanyard is passed through a ring on a harness and the loop is fitted over the upward facing point forming a closed connection to the ring and the retaining cap is lowered over the L-shaped hook, the safety flying line will be rotatably and removably attached to the harness ring through the lower swivel.

(18) In yet another variant of the invention a length of said safety flying line is adjustable, thereby providing a user with ability to control lift of said airfoil.

(19) In a final variant of the invention, a kite safety device for a kite having an airfoil with leading and trailing edges, at least two control lines attached to distal ends of an airfoil and a control flying bar attached to at least two of the control lines may be fabricated from the following components. A trim line is provided. The trim line has an upper end and a lower end and central passageway extending from the upper end to the lower end and is sized and shaped to fit slidably through a central opening in the control flying bar of a kite. A safety flying line is provided. The safety flying line has a first end and a second end and is attached at its first end to a first point adjacent a midpoint along a centerline extending from the leading edge to the trailing edge of the kite. The second end is attached to a fixture. The fixture provides a point for attachment of the flying line to a harness. When the control flying bar is released a user will be free to rotate beneath the kite and when tension is applied to the safety flying line, the kite will begin to stall and the kite will descend.

An appreciation of the other aims and objectives of the present invention and an understanding of it may be achieved by referring to the accompanying drawings and the detailed description of a preferred embodiment.

DESCRIPTION OF THE DRAWINGS

DETAILED DESCRIPTION OF THE PREFERRED EMBODIMENT (1) FIGS. 1–16 illustrate a kite safety device 305 for a kite 250 that has an airfoil 60 with leading 20 and trailing 22 edges, with at least two control lines 11, 12, 13, 14 attached to distal ends 110, 111 of the airfoil 60 and a control flying bar 50 attached to at least two of the control lines 11, 12, 13, 14. The safety device 305 has a trim line 1. The trim line 1 has an upper end 310 and a lower end 315 and central passageway 320 extending from the upper end 310 to the lower end 315 and is sized and shaped to fit slidably through a central opening 70 in the control flying bar 50 of a kite.

Figure 1:
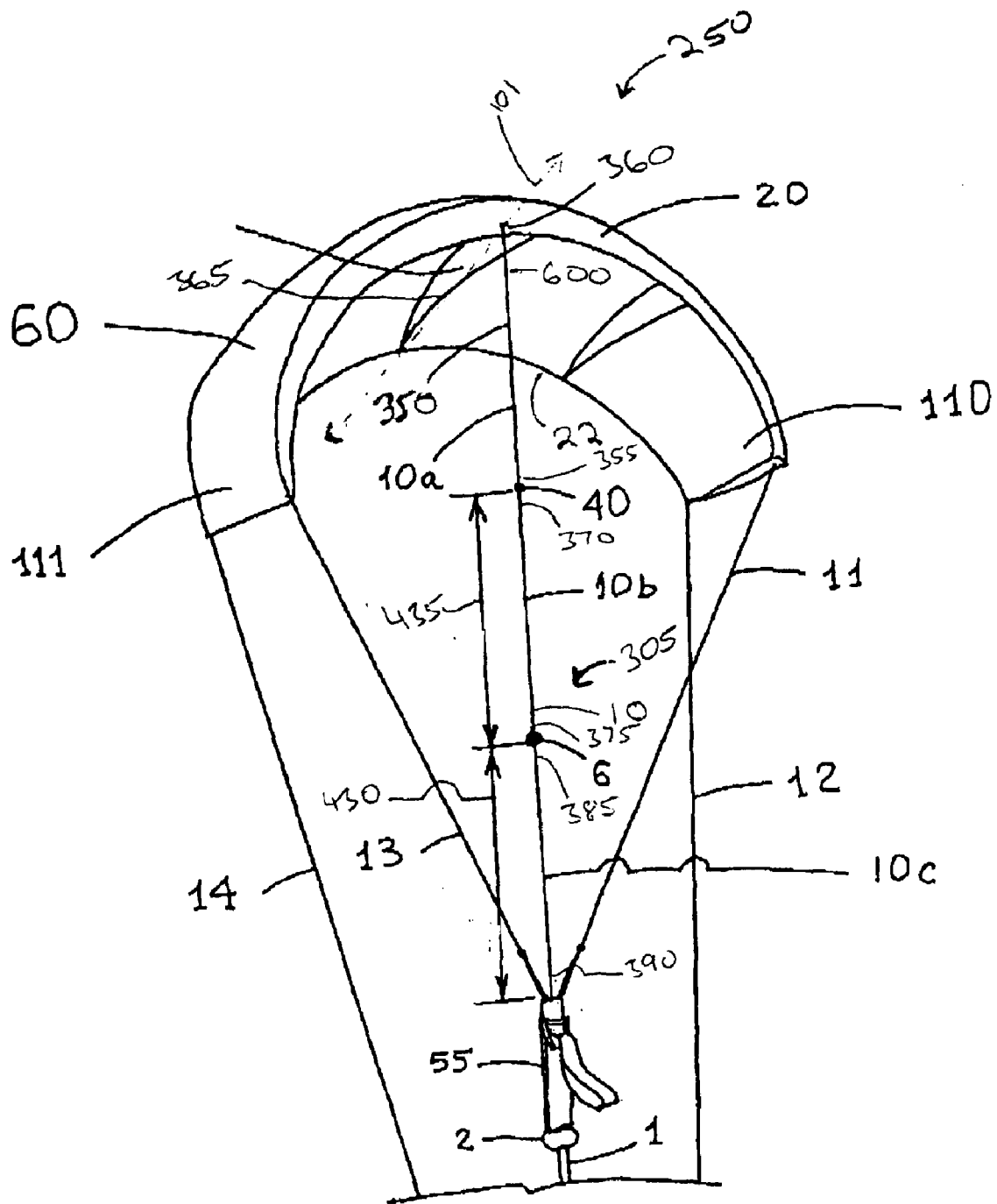
FIG. 1 is a perspective view of a four line kite with the kite safety device depicting the safety flying line, trim line, stoppers, a swivel, and control lines.

The trim line 1 has a first stopper 2 adjacent the upper end 310 and a second stopper 130 adjacent the lower end. The stoppers 2, 130 are sized and shaped to prevent the upper 310 and lower 315 ends of the trim line 1 from passing through the central opening 70.

Figure 12:
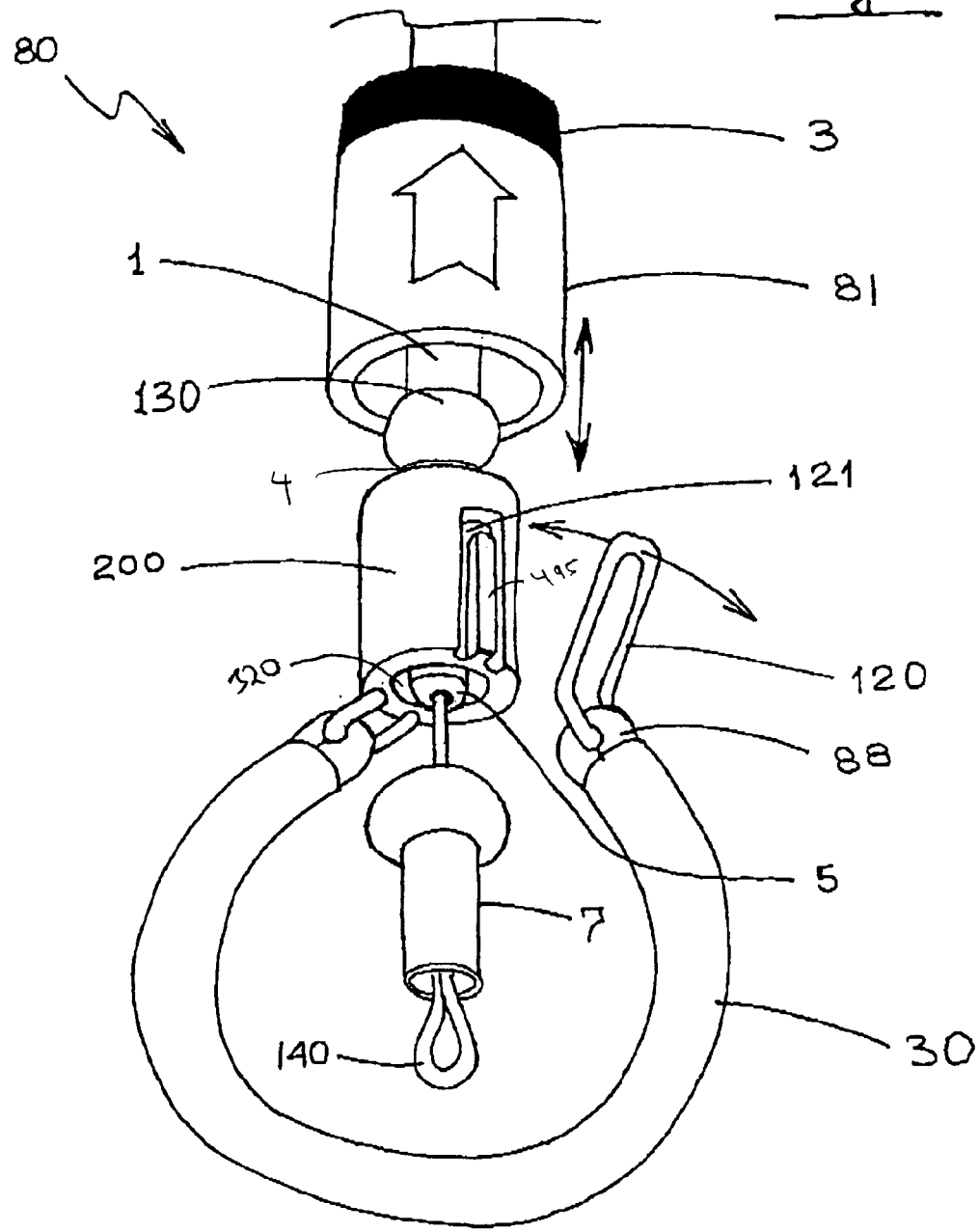
FIG. 12 is an detailed front view illustrating the safety flying line, trim loop, second stopper, upper swivel, lower swivel, loop fitting, projecting member, chamfered opening and containing cover.
Figure 13:
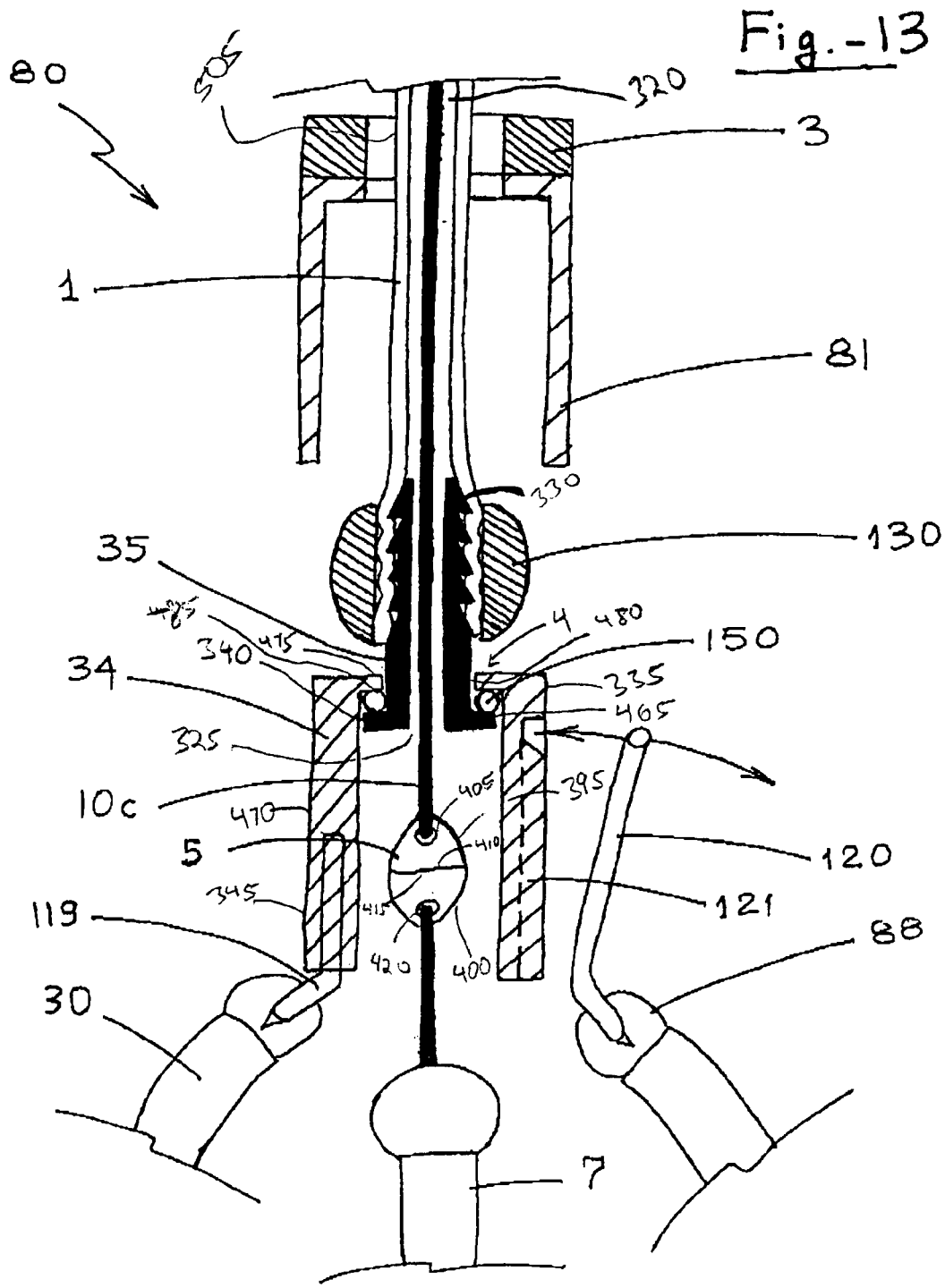
FIG. 13 is a detailed cross-sectional front view illustrating the safety flying line, trim line, trim loop, second stopper, upper swivel, lower swivel, loop fitting, projecting member, chamfered opening and containing cover.

As shown in FIGS. 12 and 13, an upper swivel 4 is provided. The upper swivel 4 has a top portion 35 and a bottom portion 34. Each of the top 35 and bottom 34 portions have a hollow central core 325, a first end 330, 335 and a second end 340, 345. The top portion 35 is attached at its first end 330 to the lower end 315 of the trim line 1. The bottom portion 34 is rotatably attached at its first end 335 to the second end 340 of the top portion 35 and attached at its second end 345 to a trim loop 30 of the kite 250.

Referring to FIGS. 1–9 and 13, a safety flying line 10 is provided. The flying line 10 has first 10a, second 10b and third 10c segments. The first segment 10a has a first end 350 and a second end 355 and is attached at its first end 350 to a first point 360 adjacent a midpoint 365 along a centerline 101 extending from the leading edge 20 to the trailing edge 22. The second segment 10b has a first end 370 and a second end 375. The second segment 10b is attached at its first end 370 to the second end 375 of the first segment 10a and has a third stopper 6 attached adjacent its second end 375. The third stopper 6 is sized and shaped to prevent the second end 375 of the second segment 10b from passing through a ring passage 380 attached to an adjustable strap 55 connected to the upper end 310 of the trim line 1. The third segment 10c has a first end 385 and a second end 390 and is attached at its first end 385 to the second end 375 of the second segment 10b and attached at its second end 390 to a first end 405 of an upper portion 395 of a lower swivel 5.

The upper portion 395 of the lower swivel 5 is rotatably mounted at a second end 410 to a first end 415 of a lower portion 400 of the lower swivel 5. A second end 420 of the lower portion 400 of the lower swivel 5 is attached to a fixture 140. The fixture 140 provides a point for attachment of the safety flying line 10 to a harness 425. When said control flying bar 50 is released a user will be free to rotate beneath the kite 250 and when tension is applied to the safety flying line 10, the kite 250 will begin to stall and the kite 250 will descend.

(2) In a variant of the invention, the second segment 10b of the safety flying line 10 is formed of resilient material.

(3) In another variant, referring to FIG. 1, the second segment 10b of the safety flying line 10 is capable of elongating to include its original length 435 plus a distance 430 between the third stopper 6 and the ring passage 380, thereby maintaining tension in said safety flying line 10.

(4) In still another variant, the third segment 10c of the safety flying line 10 is formed of wear resistant material, thereby preventing breakage of said third segment 10c due to friction with the passageway 320.

(5) In yet another variant, as shown in FIGS. 1, 2, 5, and 7, the first point 360 is adjustably mounted along the center line 101, thereby altering performance of said kite 250 when said safety flying line 10 is employed.

Figure 2:
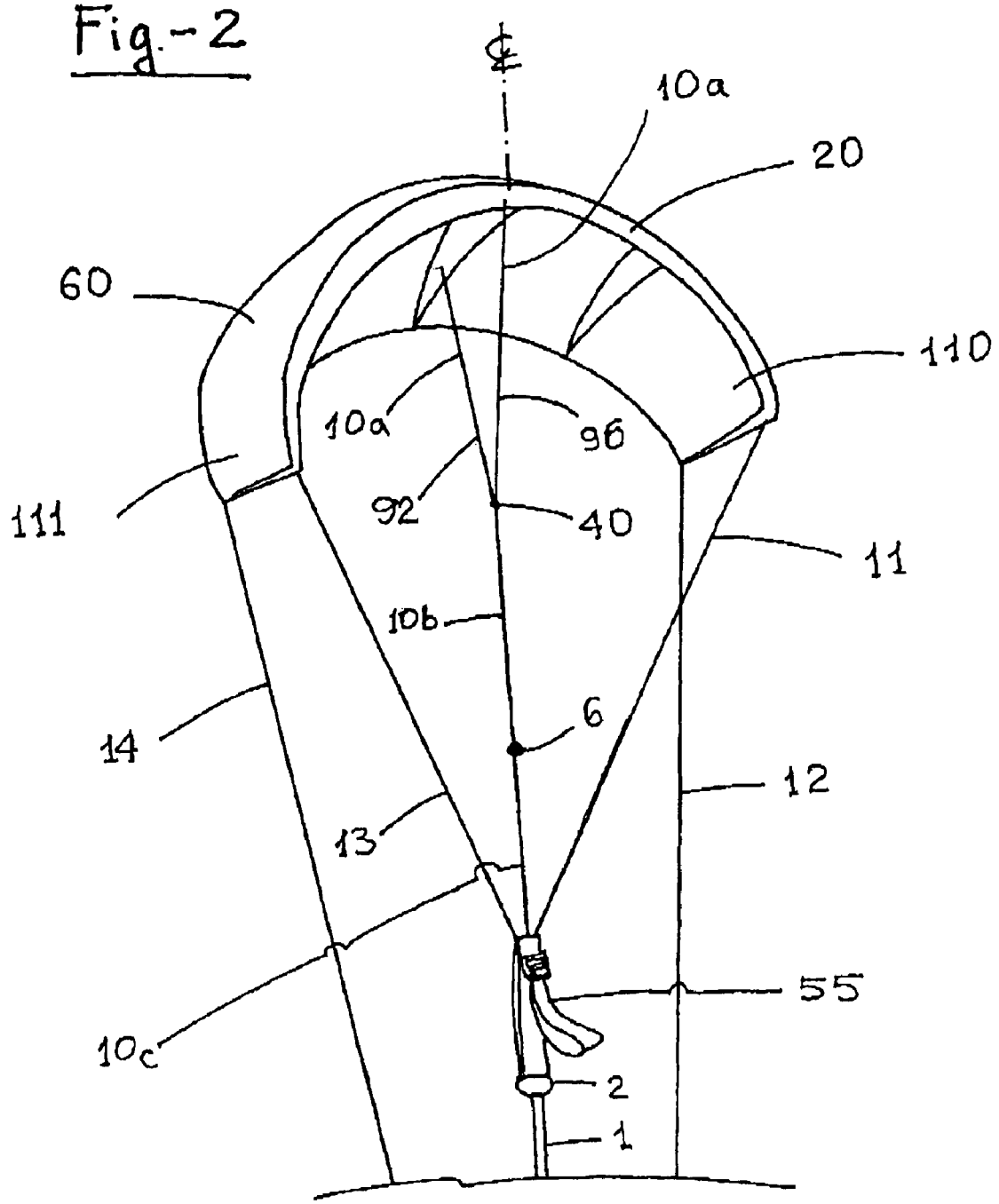
FIG. 2 is a perspective view of the FIG. 1 embodiment illustrating a safety flying line having a first segment with two portions displaced fore and aft.

(6) In another variant of the invention, as shown in FIG. 2, the first end 350 of the first segment 10a of the safety flying line 10 is divided into a front portion 96 and a rear portion 92. The front portion 96 attaches adjacent to the first point 360 and the rear portion 92 attaches at a second point 440 on the center line 101 behind the front portion 96.

(7) In a further variant, the length either of the front portion 96 or the rear portion 92 of the safety flying line 10 is adjustable, thereby permitting stall characteristics of the kite 250 as controlled by the safety flying line 10 to be customized.

Figure 3:
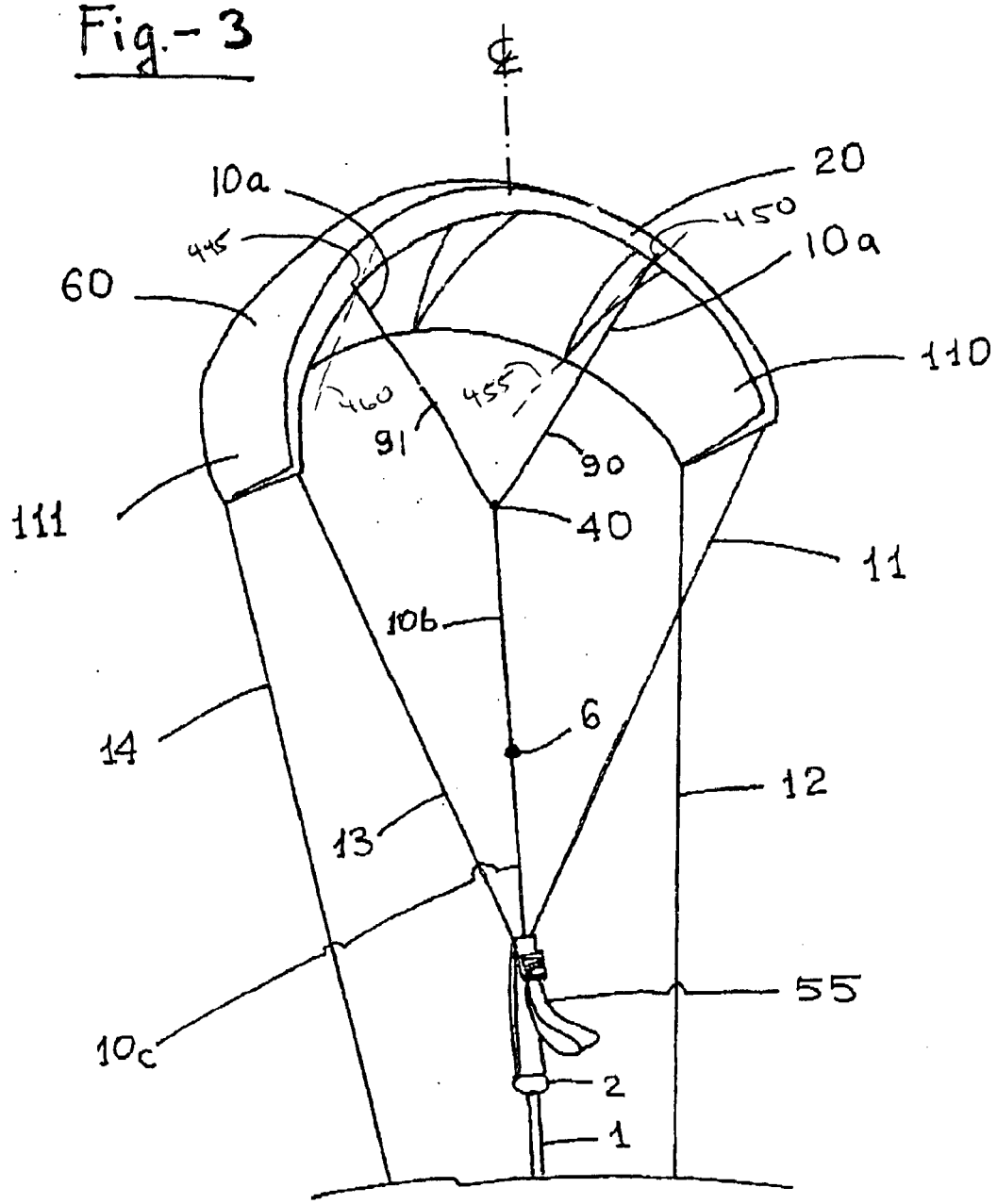
FIG. 3 is a perspective view of the FIG. 1 embodiment illustrating a safety flying line having a first segment with two portions displaced horizontally about the centerline of the kite.

(8) In still a further variant, as shown in FIGS. 1 and 3, the first end 350 of the first segment 10*a* of the safety flying line 10 is divided into a first side portion 90 and a second side portion 91. The first 90 and second side portions 91 attach adjacent to second 450 and third 445 points spaced equidistantly from the centerline 101 of the kite 250.

(9) In yet another variant, the positions of the second 450 and third 445 points are adjustable along lines 455, 460 parallel to the centerline 101.

(10) In yet an further variant of the invention, the positions of the second 450 and third 445 points are adjustable toward and away from the centerline 101.

Figure 4:
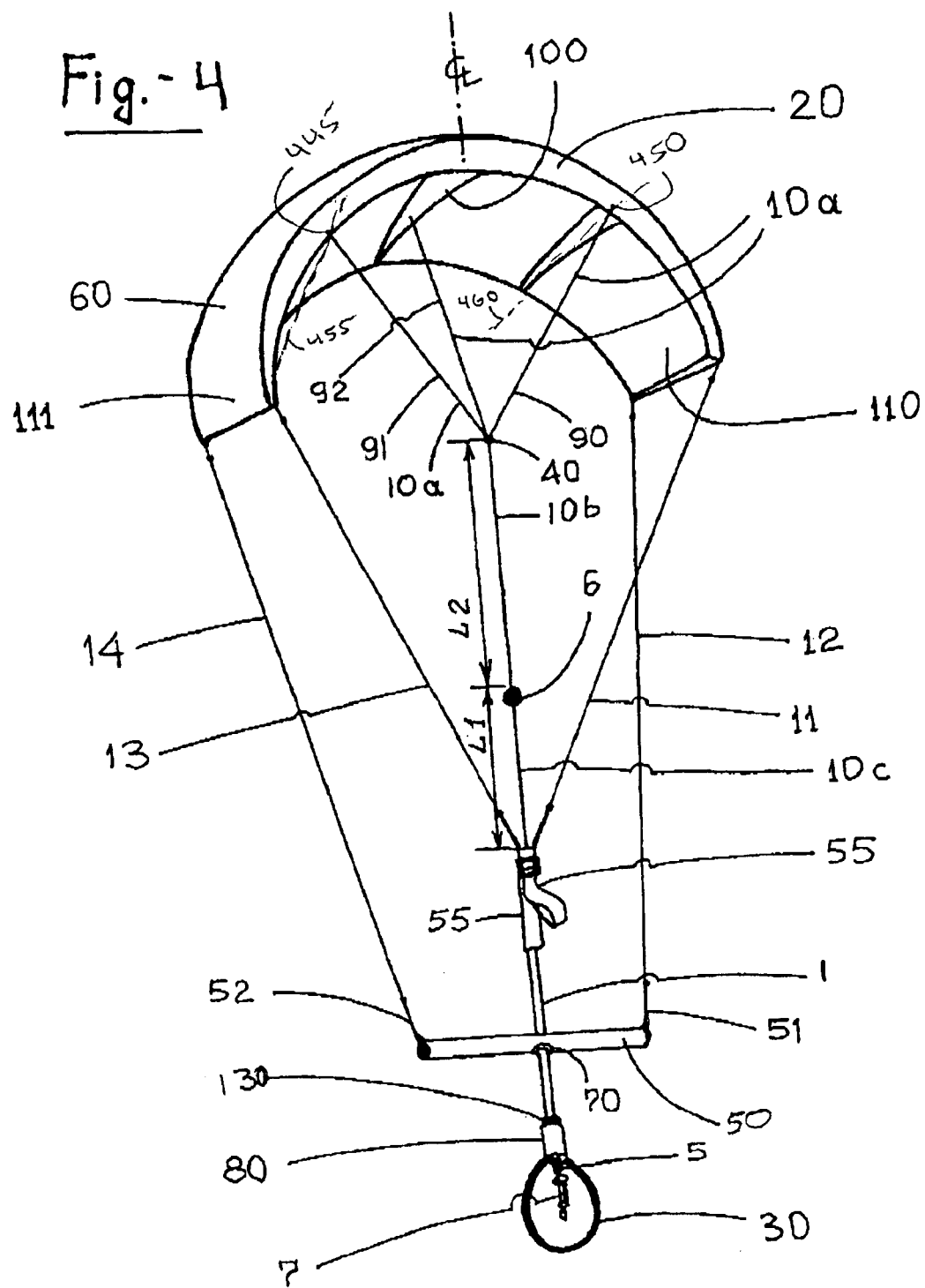
FIG. 4 is a perspective view of the FIG. 1 embodiment illustrating a safety flying line having a first segment with two portions displaced horizontally about the centerline of the kite and a third portion displaced rearwardly along the centerline.
Figure 5:
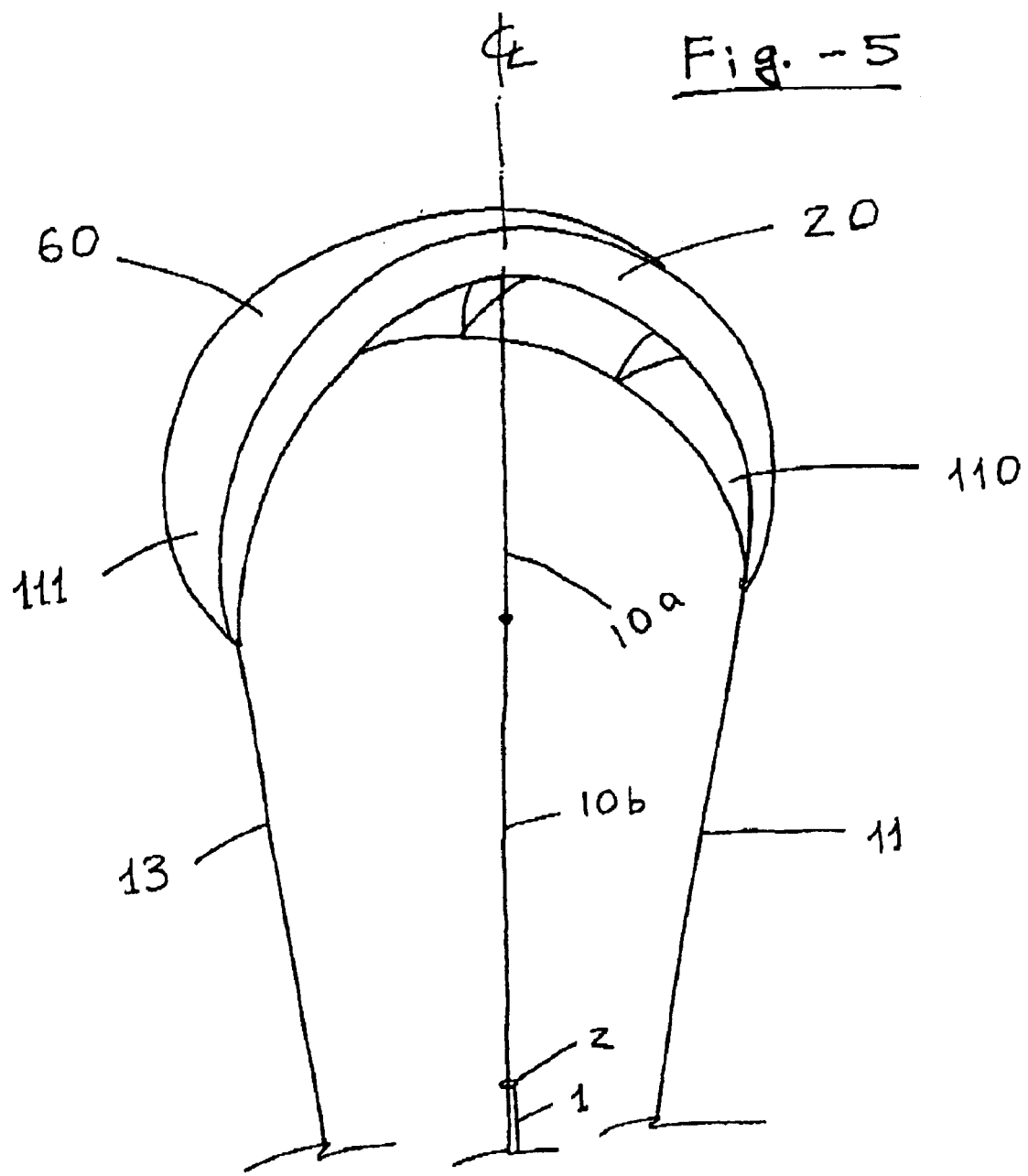
FIG. 5 is a perspective view of a two line kite with the kite safety device depicting the safety flying line and trim line.
Figure 6:
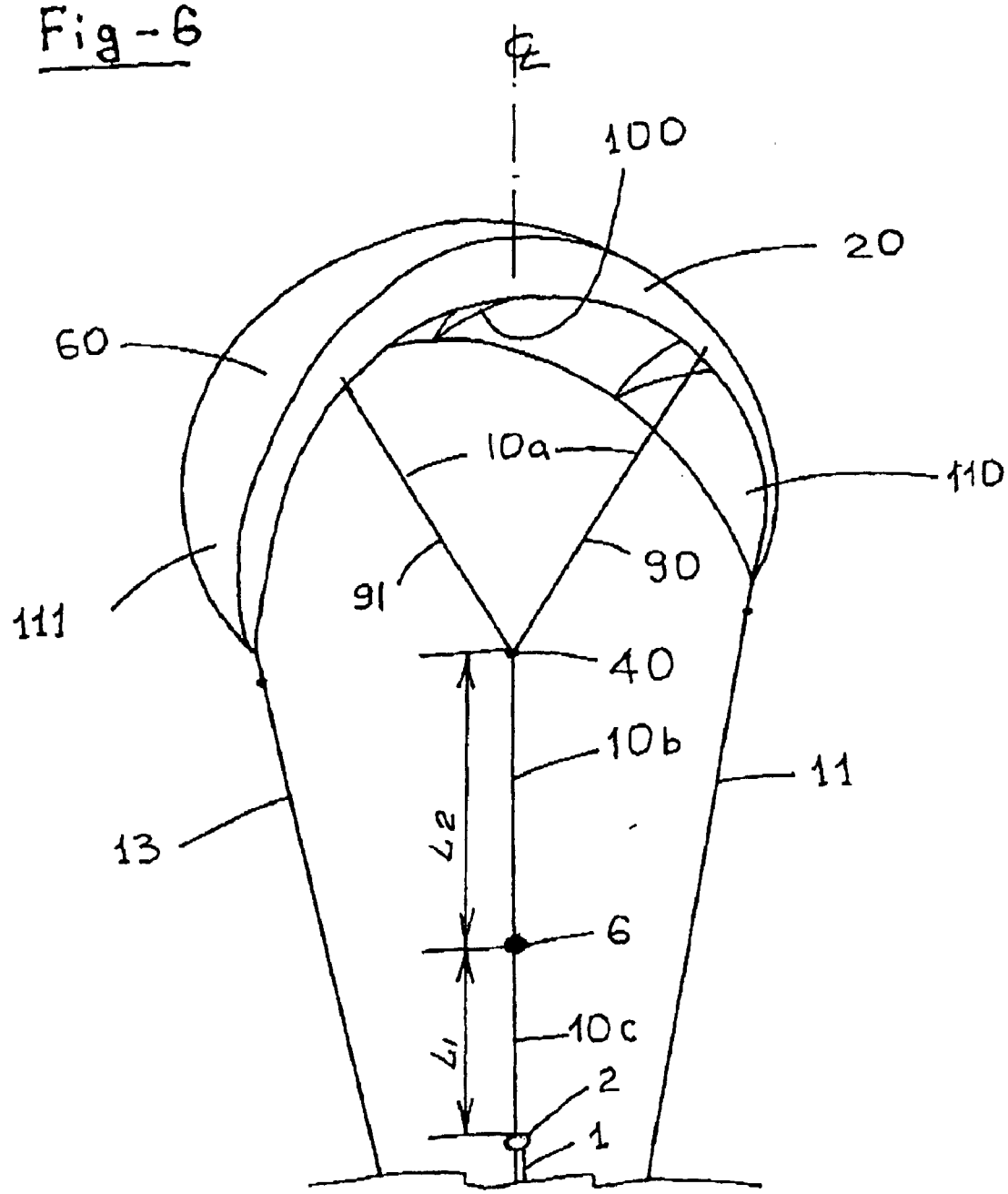
FIG. 6 is a perspective view of the FIG. 5 embodiment illustrating a safety flying line having a first segment with two portions displaced horizontally about the centerline of the kite.
Figure 7:
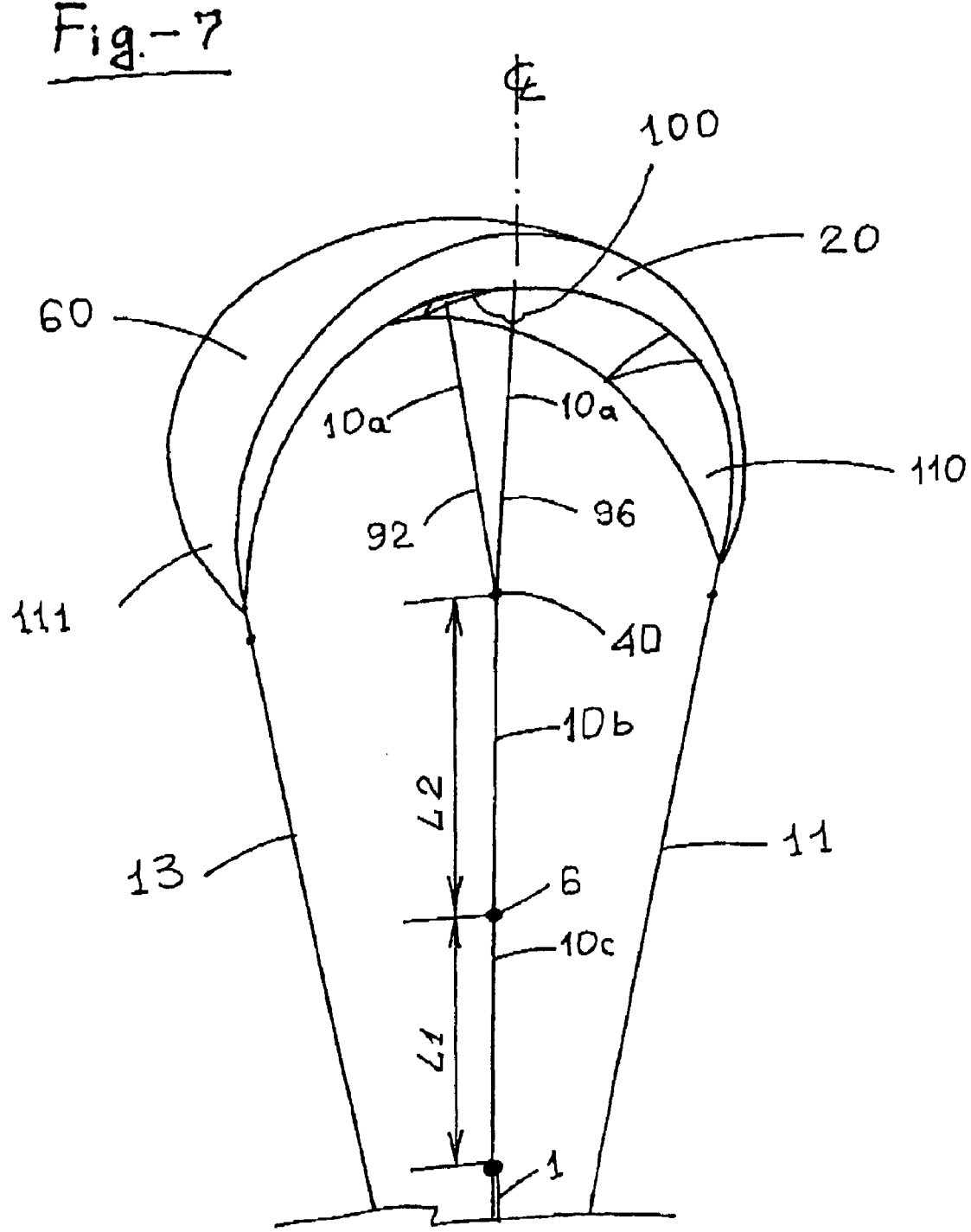
FIG. 7 is a perspective view of the FIG. 5 embodiment illustrating a safety flying line having a first segment with two portions displaced fore and aft.
Figure 8:
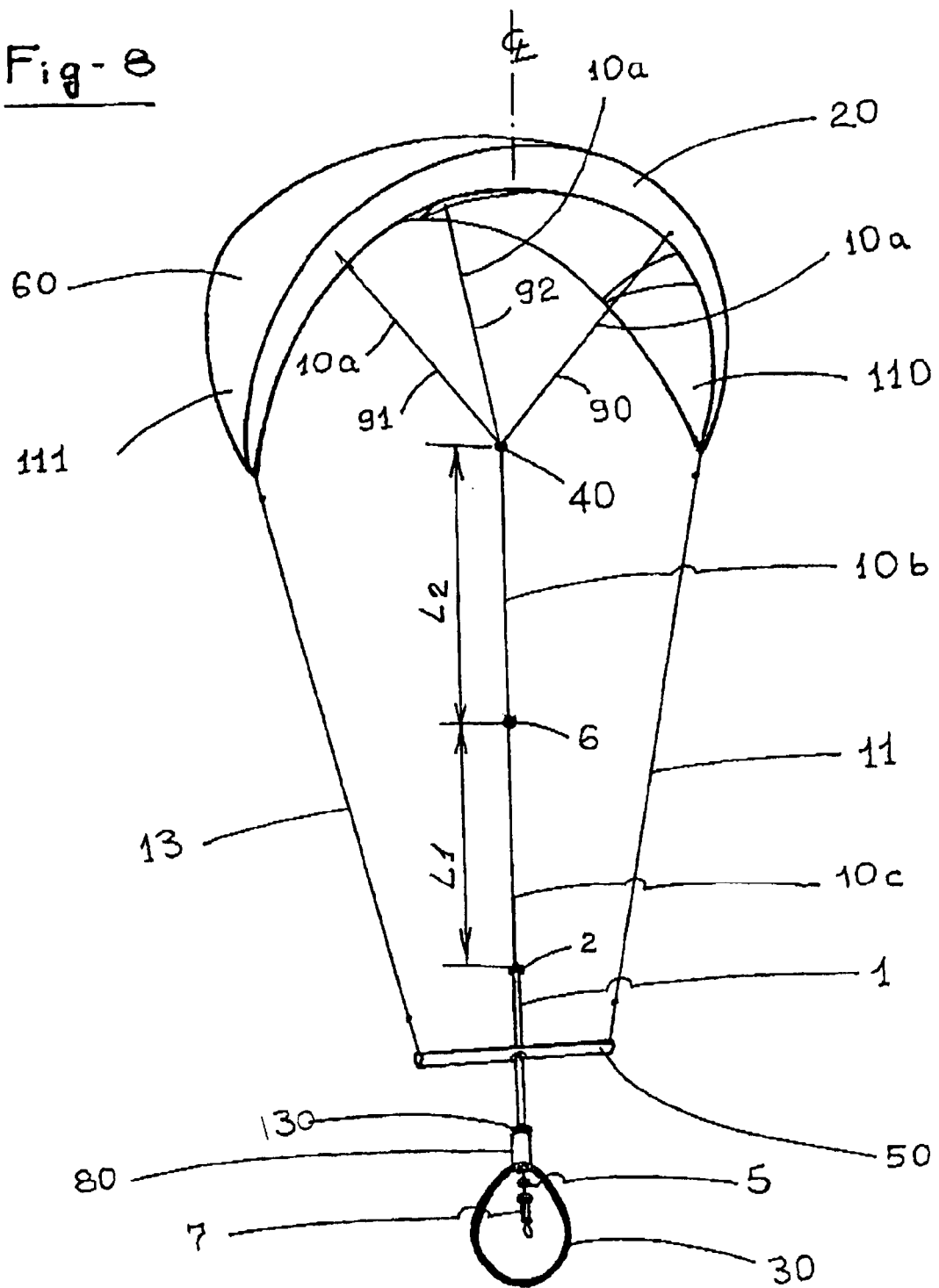
FIG. 8 is a perspective view of the FIG. 5 embodiment illustrating a safety flying line having a first segment with two portions displaced horizontally about the centerline of the kite and a third portion displaced rearwardly along the centerline.
Figure 9:
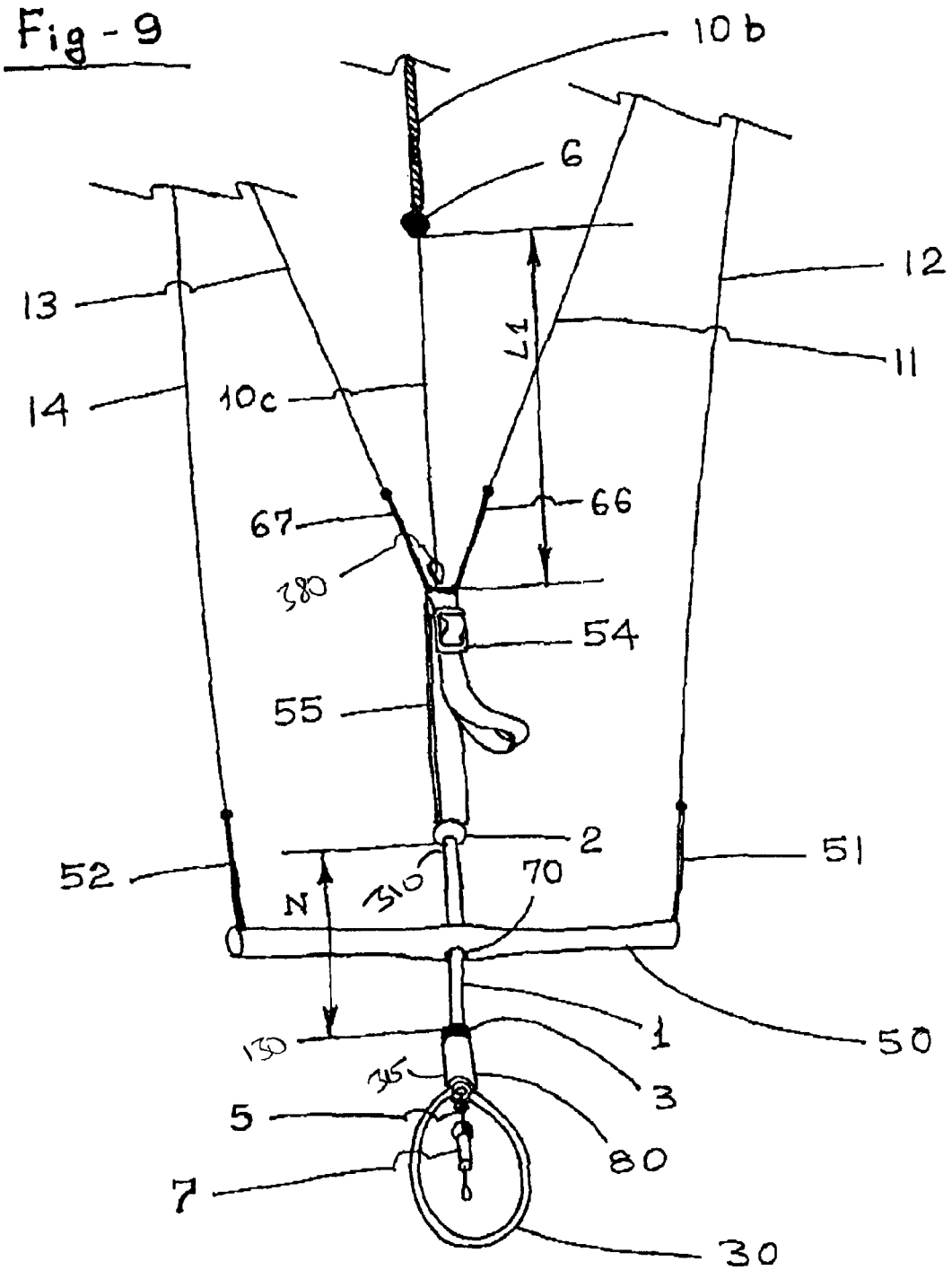
FIG. 9 is a detailed front view of the FIG. 1 embodiment illustrating the safety flying line, trim line, upper swivel, lower swivel, control lines, control flying bar, trim loop, and fixture.
Figure 10:
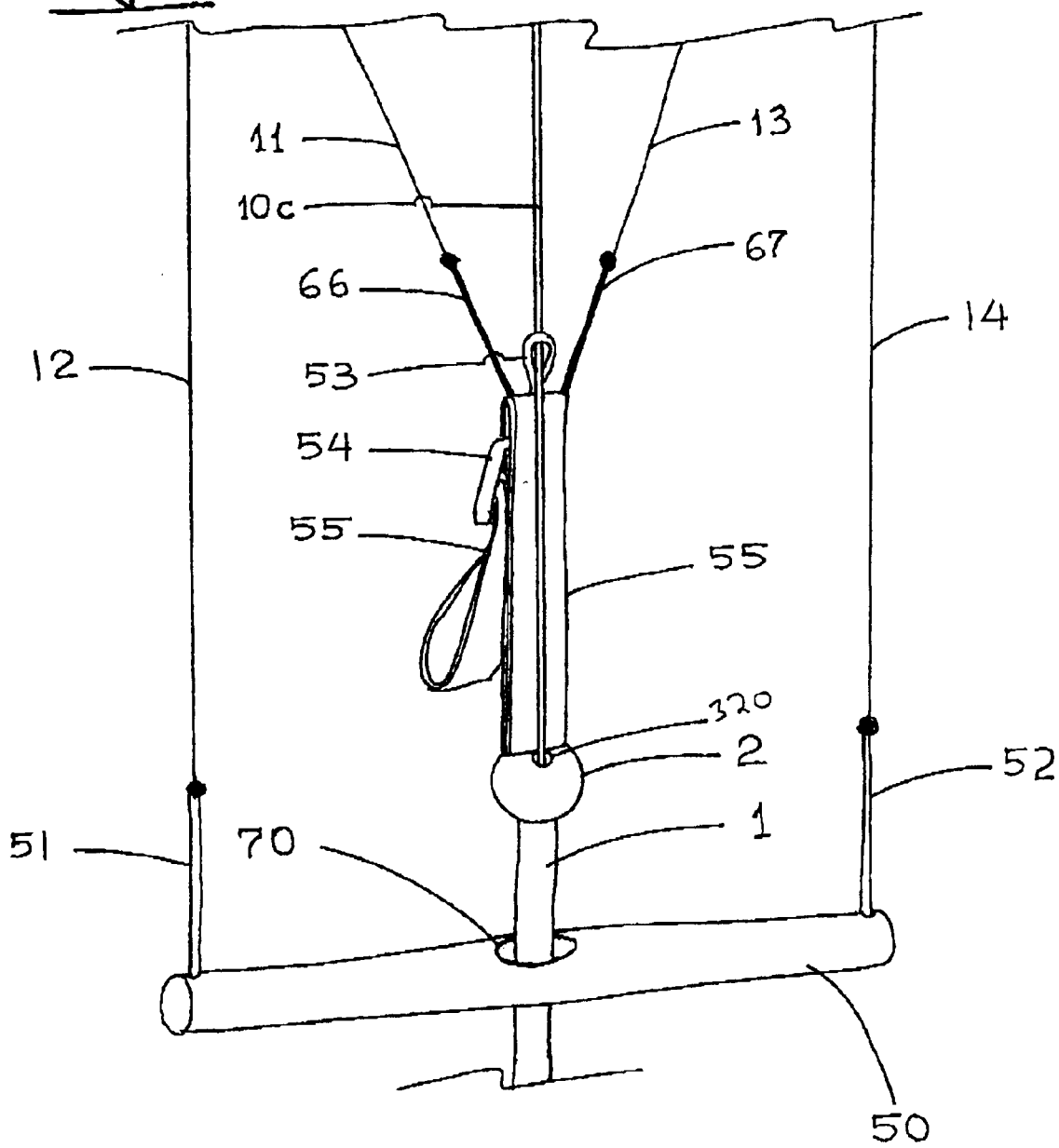
FIG. 10 is a detailed back view of the FIG. 1 embodiment depicting the safety flying line, trim line, ring passage and the control flying bar.
Figure 11:
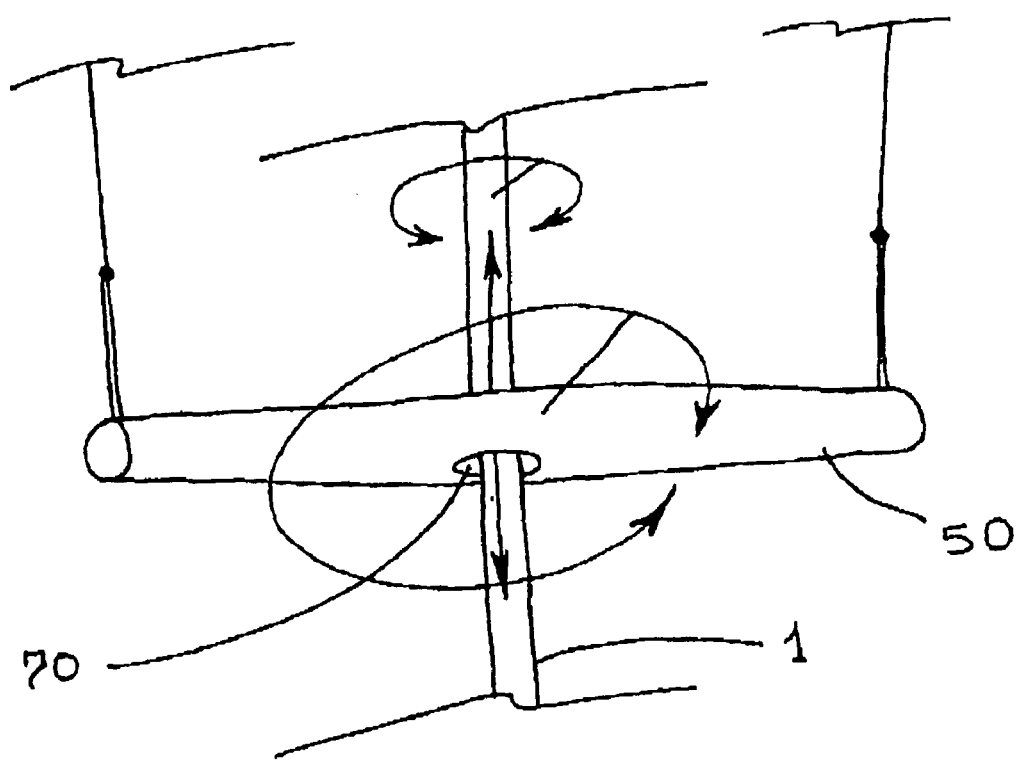
FIG. 11 is an detailed front view of the FIG. 1 embodiment illustrating the control flying bar, the trim line and central opening in the control flying bar illustrating relative motions of the control flying bar and trim line.

(11) In still a further variant, as shown in FIG. 4, The first end 350 of the first segment 10*a* of the safety flying line 10 is divided into a first side portion 90, a second side portion 91 and a rear portion 92. The first 90 and second 91 side portions attach adjacent to the second 445 and third 450 points and are spaced equidistantly from the centerline 101 of the kite 250. The rear portion 92 attaches adjacent to the first point 360.

(12) In yet a further variant, the positions of the first 360, second 445 and third 450 points are adjustable along lines 455, 460 parallel to the centerline 101.

(13) In still a further variant, the positions of the second 445 and third 450 points are adjustable toward and away from said centerline 101.

(14) In another variant, as shown in FIGS. 12 and 13, the upper swivel 4 has a top portion 35 fitted within and secured to the lower end 315 of the trim line 1. The top portion 35 includes a protruding first bearing surface 465. A bottom portion 470 is provided that is formed as a cylinder and has a semi-enclosed upper end 475. The upper end 475 has a central opening 480 through it and a second mating bearing surface 485 disposed around the central opening 480. The second mating bearing surface 485 is sized and shaped to fit slidably upon the first bearing surface 465.

The bottom portion 470 has a chamfered side opening 121 and a central projecting member 495. A containing cover 81 is provided. The cover 81 has a semi-enclosed upper end 3. The upper end 3 has a central opening 505 through it. The central opening 505 is sized and shaped to fit slidably over the trim line 1. The cover 3 is sized and shaped to fit slidably over the upper swivel 4.

(15) In still another variant, the first bearing surface 465 and second mating bearing surface 485 are shaped to accommodate either of ball 150 and roller bearings 150 and the upper swivel 4 is a plurality of either of ball (not shown) and roller bearings (not shown).

(16) In yet another variant, the trim loop 30 is formed of resilient material and has a first end 119 and a second end 88. The first end 119 is attached to the bottom portion 345 of the upper swivel 4. The second end 88 has a loop fitting 120. The loop fitting 120 is sized and shaped to fit over the projecting member 495 and within the chamfered opening 121. When the loop fitting 120 is placed within the chamfered opening 121 over the projecting member 495 and the containing cover 3 is lowered over the upper swivel 4, the second end 88 of the trim loop 30 will be secured to the bottom portion 345 of the upper swivel 4.

Figure 14:
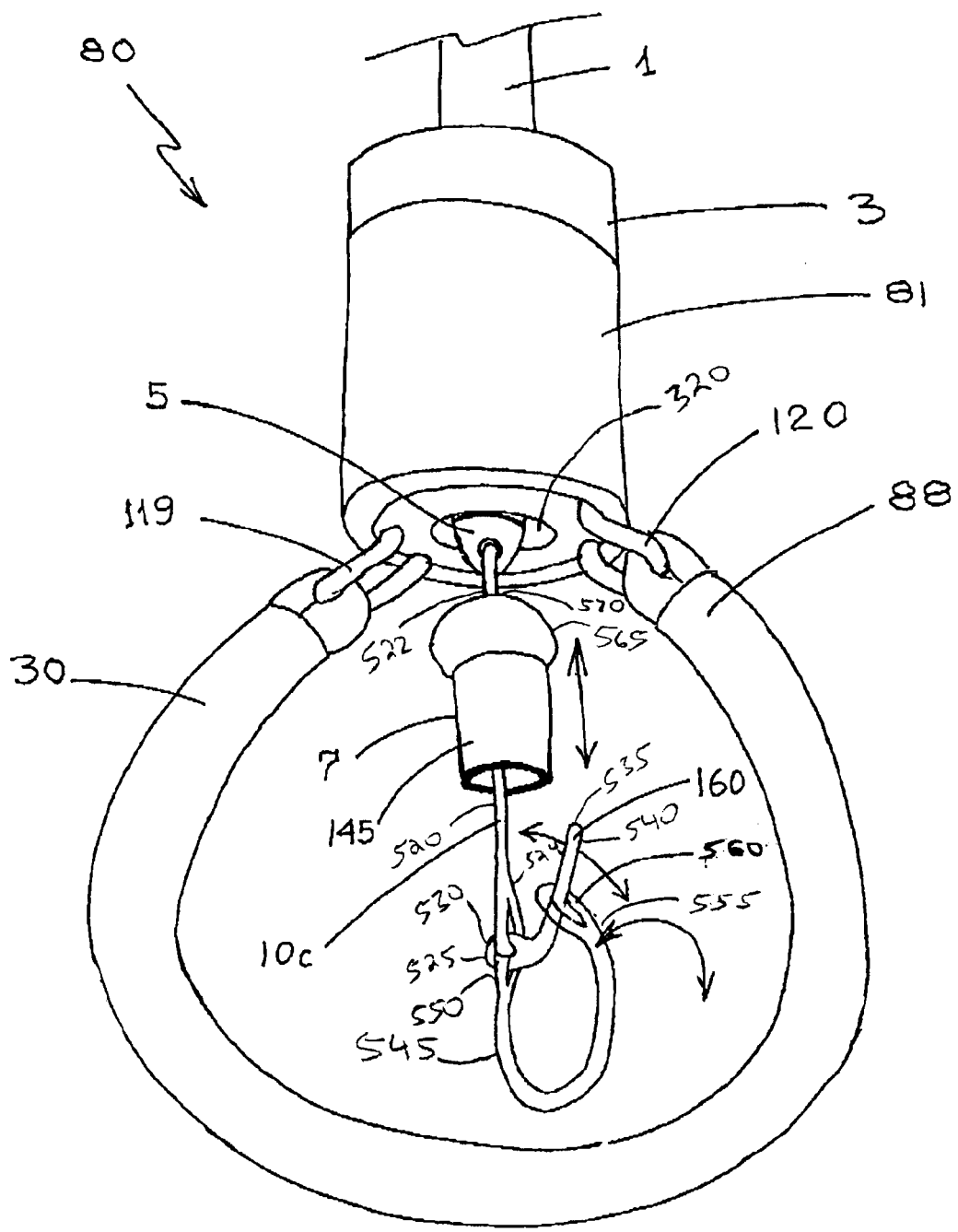
FIG. 14 is an detailed front view illustrating the safety flying line, trim loop, stopper, lower swivel, upper swivel, fixture, coupling cord, retaining lanyard, L-shaped hook, and retaining cap.
Figure 15:
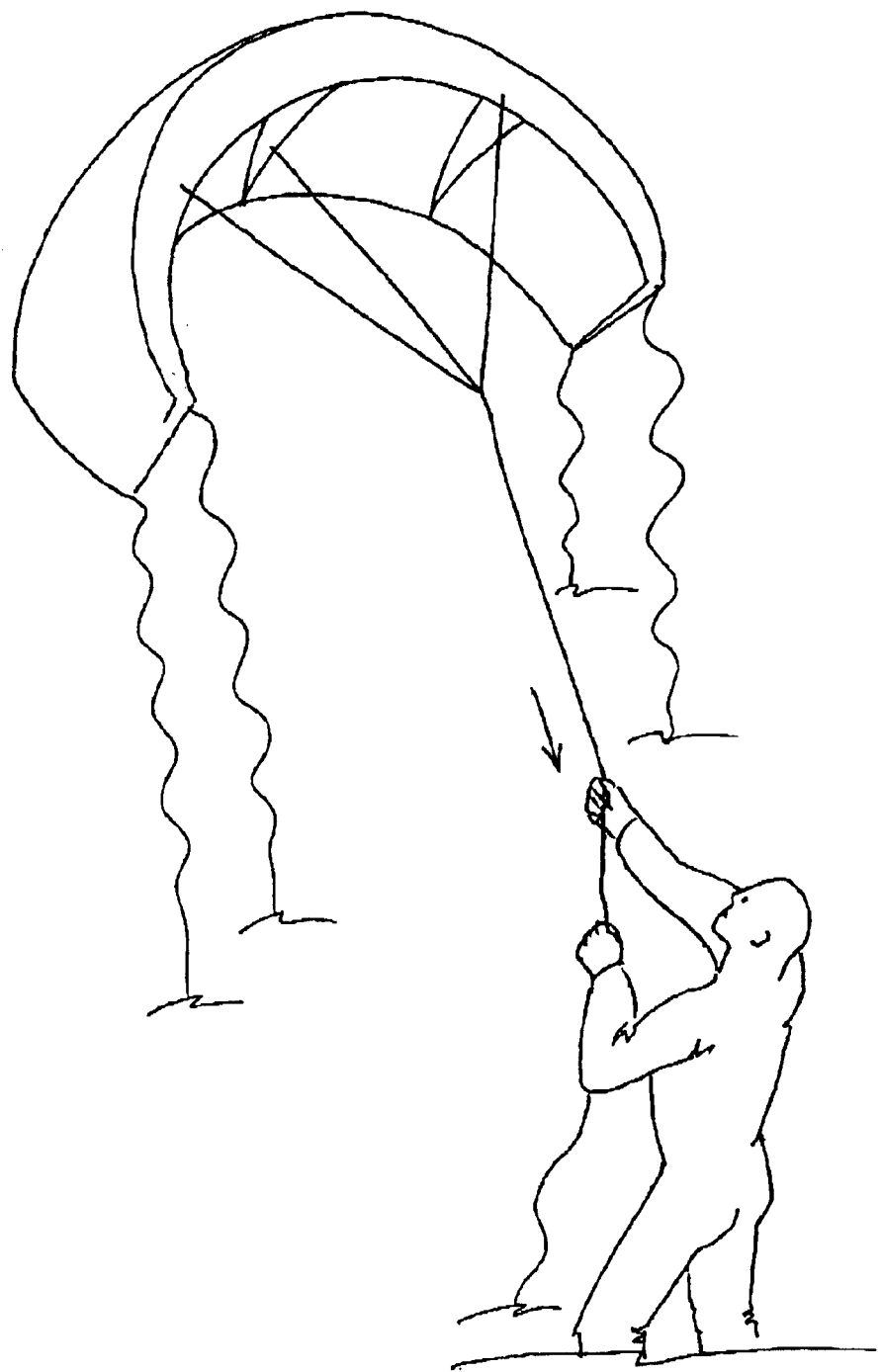
FIG. 15 is a perspective view illustrating operation of the kite by the safety flying line.

(17) In yet an further variant, as shown in FIG. 14, the fixture 140 providing a point for attachment of the flying line 10 to a harness 425 has a coupling cord 520. The cord 520 has a first end 522 and a second end 524 and is attached at its first end 522 to the lower portion 400 of the lower swivel 5. A L-shaped hook 160 is provided. The hook 160 has an orifice 525 at a first end 530 and an upward facing point 535 at a second end 540 and is attached to the second end of the coupling cord 520 at the orifice.

Figure 16:
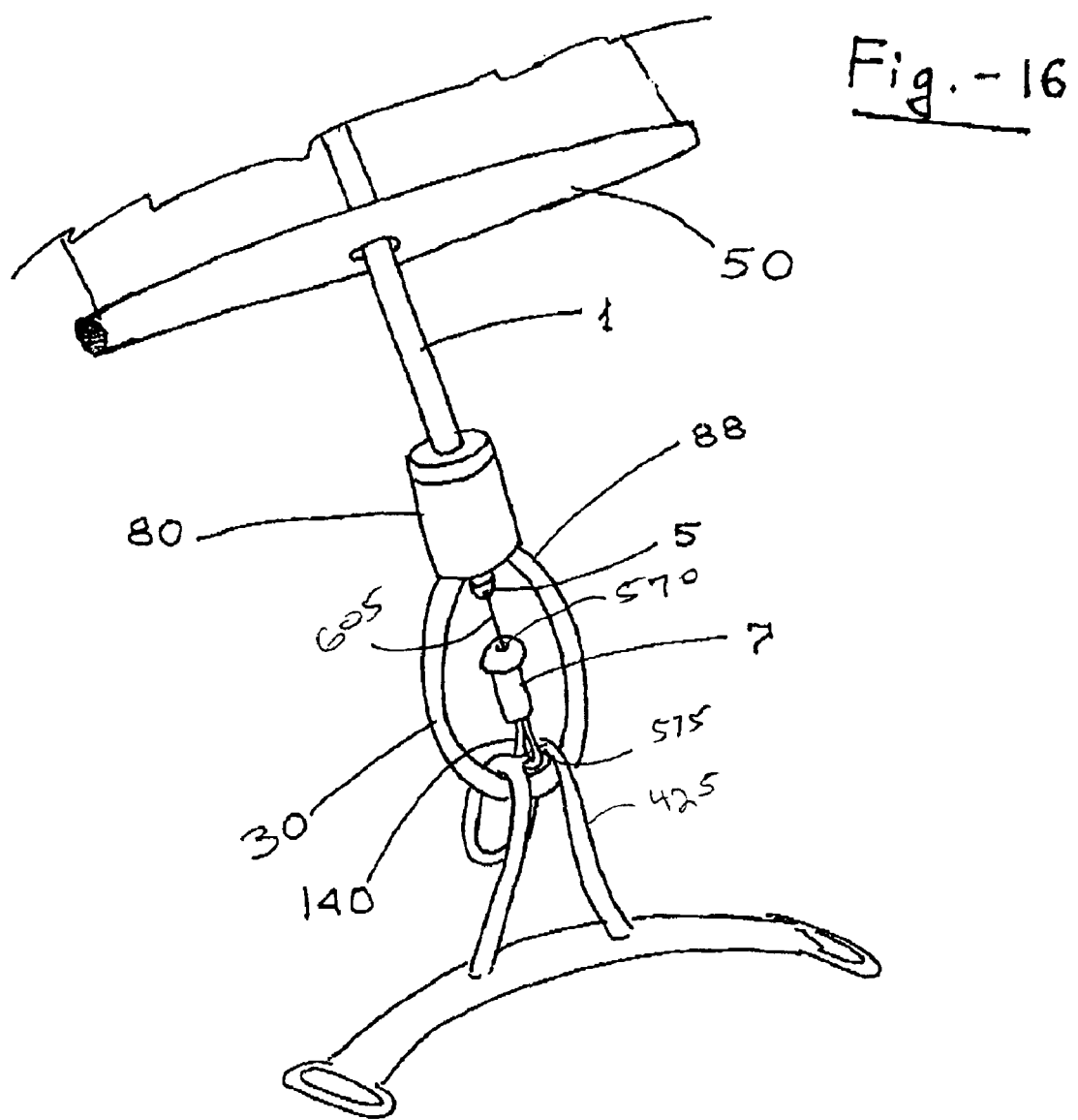
FIG. 16 is a detailed perspective view illustrating attachment of the trim loop and the safety flying line to a harness.

Referring to FIGS. 14 and 16, a retaining lanyard is provided 545. The lanyard 545 has a first end 550 and a second end 555 and is attached at the first end 550 to either the orifice 525 or the coupling cord 520. The lanyard 545 has a loop 560 at the second end 555 and is sized and shaped to fit slidably over the upward facing point of the L-shaped hook 160. A retaining cap 7 is provided. The cap 7 is sized and shaped to fit slidably over the L-shaped hook 160 and has a semi-enclosed upper end 565. The upper end 565 has a central opening 570 through it and the opening 570 is sized and shaped to fit slidably over the coupling cord 520. The cap 7 is disposed upon the coupling cord 520 above the L-shaped hook 160. When the lanyard 545 is passed through a ring 575 on a harness 425 and the loop 560 is fitted over the upward facing point 535 forming a closed connection to the ring 575 and the retaining cap 7 is lowered over the L-shaped hook 160, the safety flying line 10 will be rotatably and removably attached to the harness ring 575 through the lower swivel 5.

(18) In still another variant of the invention, the length of the safety flying line 10 is adjustable, thereby providing a user with ability to control lift of the airfoil 60.

(19) In a final variant, as shown in FIGS. 1–16, a kite safety device 305 for a kite 250 that has an airfoil 60 with leading 20 and trailing 22 edges, at least two control lines 11, 12, 13, 14 attached to distal ends 110, 111 of the airfoil 60 and a control flying bar 50 attached to at least two of the control lines 11, 12, 13, 14.

The safety device 305 has a trim line 1. The trim line 1 has an upper end 310 and a lower 315 end and central passageway 320 extending from the upper end 310 to the lower end 315 and is sized and shaped to fit slidably through a central opening 70 in the control flying bar 50 of a kite 250.

A safety flying line is provided 10. The safety flying line 10 has a first end 600 and a second end 605 and is attached at its first end 600 to a first point 360 adjacent a midpoint 365 along a centerline 101 extending from the leading edge 20 to the trailing edge 22 of the kite 250. The second end 605 is attached to a fixture 140. The fixture 140 provides a point for attachment of the flying line 10 to a harness 425. When the control flying bar 50 is released a user will be free to rotate beneath the kite 250 and when tension is applied to the safety flying line 10, the kite 250 will begin to stall and the kite 250 will descend.

The kite safety device 305 has been described with reference to particular embodiments. Other modifications and enhancements can be made without departing from the spirit and scope of the claims that follow.

What is claimed is:

1. A kite safety device for a kite having an airfoil with leading and trailing edges, at least two control lines attached to distal ends of said airfoil and a control flying bar attached to at least two of said control lines, said safety device comprising:

a trim line, said trim line having an upper end and a lower end, a central passageway extending from said upper end to said lower end and being sized and shaped to fit slidably through a central opening in said control flying bar of a kite;

said trim line having a first stopper adjacent said upper end and a second stopper adjacent said lower end, said stoppers being sized and shaped to prevent said upper and lower ends of said trim line from passing through said central opening;

an upper swivel, said upper swivel having a top portion and a bottom portion, each of said top and bottom portions having a hollow central core, a first end and a second end;

said top portion being attached at its first end to said lower end of said trim line, said bottom portion being rotatably attached at its first end to said second end of said top portion and attached at its second end to a trim loop of said kite;

a safety flying line, said flying line having first, second and third segments;

said first segment having a first end and a second end and being attached at its first end to a first point adjacent a midpoint along a centerline extending from said leading edge to said trailing edge;

said second segment having a first end and a second end, being attached at its first end to said second end of said first segment and having a third stopper attached adjacent its second end;

said third stopper being sized and shaped to prevent said second end of said second segment from passing through a ring passage attached to an adjustable strap connected to said upper end of said trim line;

said third segment having a first end and a second end and being attached at its first end to said second end of said second segment, extending through said central passageway and being attached at its second end to a first end of an upper portion of a lower swivel;

said upper portion of said lower swivel being rotatably mounted at a second end to a first end of a lower portion of said lower swivel;

a second end of said lower portion of said lower swivel being attached to a fixture, said fixture providing a point for attachment of said flying line to a harness; and whereby, when said control flying bar is released a user will be free to rotate beneath said kite and when tension is applied to said safety flying line, the kite will begin to stall and the kite will descend in a controlled manner.

2. The kite safety device, as described in claim 1, wherein said second segment of said safety flying line is formed of resilient material.

3. The kite safety device, as described in claim 2, wherein said second segment of said safety flying line is capable of elongating to include its original length plus a distance between said third stopper and said ring passage, thereby maintaining tension in said safety flying line.

4. The kite safety device, as described in claim 1, wherein said third segment of said safety flying line is formed of wear resistant material, thereby preventing breakage of said third segment due to friction with said central passageway.

5. The kite safety device, as described in claim 1, wherein said first point is adjustably mounted along said center line, thereby altering performance of said kite when said safety flying line is employed.

6. The kite safety device, as described in claim 1, wherein said first end of said first segment of said safety flying line is divided into a front portion and a rear portion, said front portion attaching adjacent said first point and said rear portion attaching at a second point on said center line behind said front portion.

7. The kite safety device, as described in claim 6, wherein a length either of said front portion and said rear portion of said safety flying line is adjustable, thereby permitting stall characteristics of said kite as controlled by said safety flying line to be customized.

8. The kite safety device, as described in claim 1, wherein said first end of said first segment of said safety flying line is divided into a first side portion and a second side portion, said first and second side portions attaching adjacent second and third points spaced equidistantly from said centerline of said kite.

9. The kite safety device, as described in claim 8, wherein positions of said second and third points are adjustable along lines parallel to said centerline.

10. The kite safety device, as described in claim 8, wherein positions of said second and third points are adjustable toward and away from said centerline.

11. The kite safety device, as described in claim 1, wherein said first end of said first segment of said safety flying line is divided into a first side portion, a second side portion and a rear portion, said first and second side portions attaching adjacent second and third points spaced equidistantly from said centerline of said kite and said rear portion attaching adjacent said first point.

12. The kite safety device, as described in claim 11, wherein positions of said first, second and third points are adjustable along lines parallel to said centerline.

13. The kite safety device, as described in claim 12, wherein positions of said second and third points are adjustable toward and away from said centerline.

14. The kite safety device, as described in claim 1, wherein said upper swivel further comprises:

a top portion fitted within and secured to said lower end of said trim line, said top portion including a protruding first bearing surface;

a bottom portion formed as a cylinder having a semi-enclosed upper end, said upper end having a central opening therethrough, and a second mating bearing surface disposed around said central opening, said second mating bearing surface being sized and shaped to fit slidably upon said first bearing surface;

said bottom portion having a chamfered side opening including a central projecting member; and a containing cover, said cover having a semi-enclosed upper end, said upper end having a central opening therethrough, said central opening being sized and shaped to fit slidably over said trim line;

said cover being sized and shaped to fit slidably over said upper swivel.

15. The kite safety device, as described in claim 14, wherein said first bearing surface and said second mating bearing surface are shaped to accommodate either of ball and roller bearings and said upper swivel comprises a plurality of either of ball and roller bearings.

16. The kite safety device, as described in claim 14, wherein said trim loop is formed of resilient material and further comprises:

a first end and a second end, said first end being attached to said bottom portion of said upper swivel;

said second end comprising a loop fitting, said loop fitting being sized and shaped to fit over said projecting member and within said chamfered opening; and whereby, when said loop fitting is placed within said chamfered opening over said projecting member and said containing cover is lowered over said upper swivel, said second end of said trim loop will be secured to said bottom portion of said upper swivel.

17. The kite safety device, as described in claim 1, wherein said fixture providing a point for attachment of said flying line to a harness further comprises:

a coupling cord, said cord having a first end and a second end and being attached at its first end to said lower portion of said second swivel;

a L-shaped hook, said hook comprising an orifice at a first end and an upward facing point at a second end, and being attached to said second end of said coupling cord at said orifice;

a retaining lanyard, said lanyard having a first end and a second end, being attached at said first end to either of said orifice and said coupling cord, having a loop at said second end, said loop being sized and shaped to fit slidably over said upward facing point of said L-shaped hook;

a retaining cap, said cap being sized and shaped to fit slidably over said L-shaped hook and having a semi-enclosed upper end, said upper end having a central opening therethrough, said opening being sized and shaped to fit slidably over said coupling cord, said cap being disposed upon said coupling cord above said L-shaped hook; and whereby, when said lanyard is passed through a ring on a harness and said loop is fitted over said upward facing point, thereby forming a closed connection to said ring and said retaining cap is lowered over said L-shaped hook, said safety flying line will be rotatably and removably attached to said harness ring through said lower swivel.

18. The kite safety device, as described in claim 1, wherein a length of said safety flying line is adjustable, thereby providing a user with ability to control lift of said airfoil.

19. A kite safety device for a kite having an airfoil with leading and trailing edges, at least two control lines attached to distal ends of said airfoil and a control flying bar attached to at least two of said control lines, said safety device comprising:

a trim line, said trim line having an upper end and a lower end, a central passageway extending from said upper end to said lower end and being sized and shaped to fit slidably through a central opening in said control flying bar;

a safety flying line having a first end and a second end and being attached at its first end to a first point adjacent a midpoint along a centerline extending from said leading edge to said trailing edge;

said flying line extending through said central passageway and being attached at said second end to a fixture, said fixture providing a point for attachment of said flying line to a harness; and whereby, when said control flying bar is released a user will be free to rotate beneath said kite and when tension is applied to said safety flying line, the kite will begin to stall and the kite will descend in a controlled manner.

* * * * *